United States Patent

[11] 3,586,816

| | | |
|---|---|---|
| [72] | Inventor | Wilhelm F. Hagen<br>Woodstock, Conn. |
| [21] | Appl. No. | 747,562 |
| [22] | Filed | July 25, 1968 |
| [45] | Patented | June 22, 1971 |
| [73] | Assignee | American Optical Corporation<br>Southbridge, Mass. |

[54] SPOT WELDING SYSTEM AND METHOD
7 Claims, 9 Drawing Figs.

[52] U.S. Cl. .................................................. 219/121,
  331/94.1
[51] Int. Cl. ............................................... B23k 27/00
[50] Field of Search ........................................ 219/121;
  95/1.1; 331/94.5

[56] References Cited
UNITED STATES PATENTS

| 3,266,393 | 8/1966 | Chitayat ...................... | 95/1.1 |
| 3,286,193 | 11/1966 | Koester ....................... | 331/94.5 |
| 3,303,319 | 2/1967 | Steigerwald ................. | 219/121 |
| 3,388,314 | 6/1968 | Gould ........................... | 219/121 |
| 3,388,461 | 6/1968 | Lins ............................. | 219/121 |
| 3,452,178 | 6/1969 | Kleen ........................... | 219/121 |

OTHER REFERENCES
IBM TECHNICAL DISCLOSURE BULLETIN Vol. 8 No. 6/11/1965

*Primary Examiner*—Milton O. Hirshfield
*Assistant Examiner*—R. Skudy
*Attorney*—Noble S. Williams ABSTRACT: A system and method for microscopic spot welding with laser radiation. The invention, having particular relationship to microscopic multiple spot welding, employs mode selection of laser emitted radiation. A number of objective lenses are positioned in a diverging mode selected laser beam and the lenses are arranged within the spread of the beam in relative geometrical positions corresponding to the number and positions of spots requiring welding. Auxiliary lens means may be employed to direct the diverging laser beam toward the object to obtain proper spacing of the welding spots. The system produces a multiplicity of microscopic welding spots on the object each of a minimum size governed by the size of the Airy disc produced by its respective objective lens.

PATENTED JUN22 1971        3,586,816

INVENTOR.
WILHELM F. HAGEN

BY Noble J. Williams
ATTORNEY 3,586,816

SPOT WELDING SYSTEM AND METHOD

BACKGROUND OF THE INVENTION

1. Field of the Invention

Spot welding with particular relationship to a system and method for simultaneously producing a multiplicity microscopic spot welds on an object using laser output radiation as the source of welding energy.

2. Description of the Prior Art

In order to obtain sufficient radiant energy density for welding at a spot, a high radiance source is essential and the development of lasers has made such sources available.

Conventional lasers capable of producing sufficient energy density for metallic welding operations generally operate with multimode oscillations since the dimensions of their resonant cavities are large compared with the wavelength of emitted radiation. Thus, the output beams of such devices cannot be focused onto a spot as small as determined by diffraction which is necessary for microscopic spot welding.

The present invention, however, enables the use of conventional laser devices for microscopic spot welding and further provides for microscopic multispot welding with corollary features of versatility in the selection, arrangement and control of welding spot patterns, spot sizes and choice of laser device.

SUMMARY OF THE INVENTION

According to principles of the present invention, the beamspread of a particular laser selected to supply the spot welding energy is reduced by spatial mode selection outside the laser cavity to permit focusing thereof through a system of lenses onto a number of spots each of microscopic size. The spatial mode selection is achieved by placing a pinhole at the focus of a collecting lens arranged to receive the output of the laser. In the diverging beam emerging from the pinhole, a number of objective lenses are placed in relative geometrical position corresponding to the number and position of the required welding spots on an object located behind the objective lenses. Forwardly of the objective lenses, in one embodiment of the invention, an additional lens is positioned in the diverging beam to direct the beam toward the object to be welded for achieving a desired spacing of the aforesaid welding spots. Proper spacing and location of the welding spots may also be achieved by rendering the objective lenses suitably prismatic for deflecting beams of welding energy passing therethrough toward any desired point on the object to be welded. Thus, with or without even distribution of the objective lenses in the beam emerging from the pinhole, an even or uneven distribution of welding spots may be obtained, whichever is desired.

It will become apparent hereinafter that the inventive concept, briefly described hereinabove, features a spot welding system and method for producing, with a single source of conventional laser radiation, welds of microscopic size in any reasonable number, location or general patterning on an object requiring such welding. Other features include provision for controlling the intensity of energy applied to the welding spots whereby uniform or different energy densities for different types of welds in the single multispot welding operation may be attained, as desired.

The invention will be more fully understood by reference to the following detailed description and the accompanying drawings.

DESCRIPTION OF THE PREFERRED EMBODIMENTS

Figure 1:
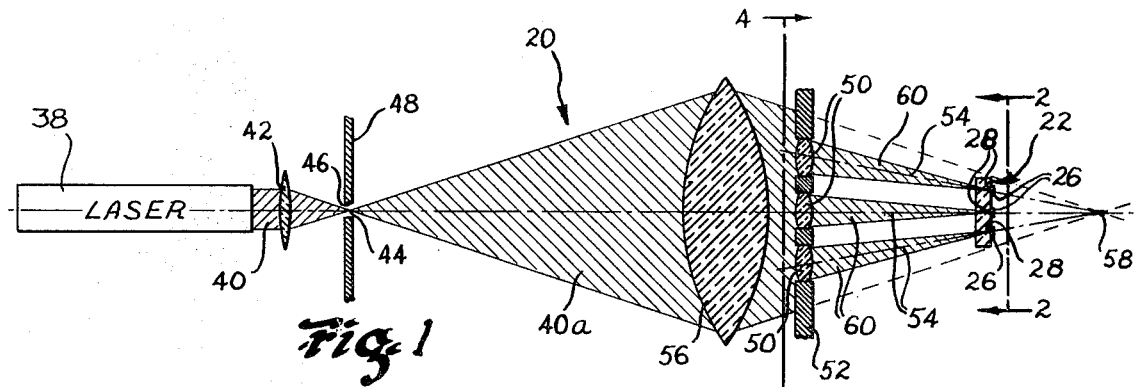
FIG. 1 is a schematic illustration of one embodiment of the invention.

Spot welding system 20, FIG. 1, is illustrative of one embodiment of the present invention wherewith microscopic spot welding of an object 22 may be accomplished according to principles of the invention.

Object 22 may comprise any form or type of article requiring pinpoint or microscopic spot welding.

In the field of microelectronics, integrated-circuit devices are typical of such articles and object 22 has been illustrated as being one such article. It is to be understood, however, that this illustration is made without prejudice to the applicability and usefulness of the present invention in other fields.

Figure 2:
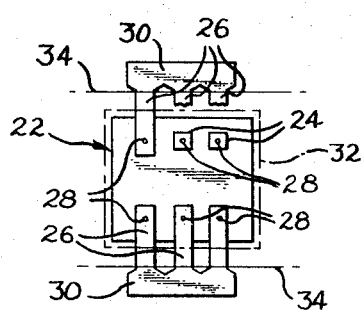
FIG. 2 is a view taken along line 2–2 of FIG. 1 looking in the direction indicated by arrows wherein an exemplary object to be spot welded according to principles of the invention is illustrated.

The illustration of object 22 in FIGS. 1 and 2 is intended to represent a transparent integrated-circuit device of the type commonly referred to as a "silicon ship" having a number of pads 24 of electrically conductive material, two of which can be seen in the broken away portion of FIG. 2. Electrical leads 26 requiring individual spot welding to pads 24 can best be seen in FIG. 2, two of which have been broken away to permit the aforesaid showing of pads 24.

For realization of the microscopic nature of spot welding operations intended to be performed according to principles of this invention, it is pointed out that the silicon ship may, typically, be 0.050 inches square with as many as 16 or more spaced pads 24 disposed along an edge thereof. Only three pads have been shown in FIg. 2 for ease and clarity of illustration. A not uncommon requirement for size of welding spot is that it be in the order of 0.15 millimeter in diameter and centered in the width of a lead 26 and its corresponding pad 24 so as to occupy no more than a small fraction of the width of the lead or pad. Such welding spots are illustrated in FIG. 2 by dots 28.

Figure 3:
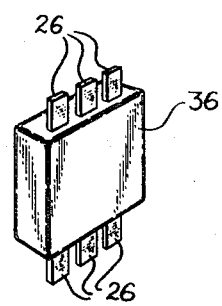
FIG. 3 is a perspective illustration of a useful application of the aforesaid object.
Figure 4:
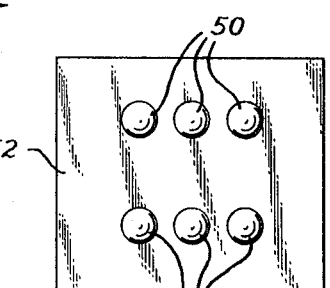
FIG. 4 is a view taken along line 4–4 of FIG. 1 wherein there is illustrated one arrangement of objective lens means useful in an application of the welding system of FIG. 1.

Electrical leads may be punched or otherwise formed from strips of thin sheet metal as sprigs of the strip. The sprigs may be held in parallel aligned relationship with each other during welding to the silicon chip by an unpunched portion 30 (FIG. 2) of the sheet metal strip. After the welding of spots 28, the unit is usually encapsulated in a plastic or the like as indicated by dot-dash outline 32 in FIG. 2 and portions 30 are removed therefrom by cutting along lines 34 to produce a plug-in electronic circuit unit 36 (FIG. 3) with leads 26 constituting the prongs or plugs of the unit.

Details of the electronic circuitry and/or function of unit 36 will not be dealt with herein since such details are not pertinent to this invention. In its relationship to microscopic spot welding systems and method, it will become apparent that the present inventive concept has no particular dependence upon the intended usage or function of the object worked upon.

Referring more particularly to welding system 20, FIG. 1, it can be seen that the source of spot welding energy is laser 38. Laser 38 may comprise any one of various well-known types capable of producing a beam 40 of sufficient radiance or radiant energy density per unit of solid angle of beamspread measured in steradians (sr.) to perform welding operations. A delivered radiance in beam 40 in the order of $10^6(j/cm.^2 sr.)$, where $j$ = joules, may be considered typical or generally suitable for the type of welding operation herein contemplated. Greater or less radiance may, of course, be used.

Laser 38 is represented in the drawing by a block diagram which is intended to include all equipment necessary for producing laser beam 40 and operating the laser. Structural and functional details of such equipment will not be dealt with herein since these are well known to the artisan. For those interested in such details, however, reference may be made to the introductory portion of the specification in U.S. Pat. No. 3,242,440 or to U.S. Pat. No. 3,281,712.

Collector lens 42 in beam 40 focuses the beam at point 44. Pinhole 46 in mask 48, positioned at point 44, effects mode selection of laser energy in beam 40a to within an angle of spreading according to the ratio of pinhole size to focus length of lens 42.

The minimum useful diameter of pinhole 46 is determined by the resolving limit of lenses used to focus portions of beam 40a onto welding spots 28. These lenses comprise objectives 50 supported in an opaque mask 52. Each lens receives and focuses a portion of beam 40a through object 22 (the transparent silicon chip) onto welding spots 28.

In this embodiment of the invention, the arrangement of objectives 50 corresponds geometrically to the pattern of spots 28 to be welded on object 22. The optical projection axes 54 of lenses 50 are rendered properly relatively convergent for achieving the desired spacing and positioning of spots 28 by lens 56 immediately preceding objectives 50 in the direction of propagation of beam 40a. Lens 56 receives and bends light rays in beam 40a into converging relationship with point 58 where the several axes 54 intersect each other.

Beam 60, i.e. portions of spatially mode selected beam 40a which are focused by objectives 50, form welding spots 28 wherein the minimum spot sizes are determined by the size of the Airy disc produced by respective objectives 50.

It is desirable to utilize the largest possible aperture size for each of objectives 50 and shortest focal distance from mask 52. Large apertures of objectives 50 which collect most of the laser radiation emerging from pinhole 46 prevent undue waste of such energy and the short focal length is desirable to obtain minimum spot size and high energy densities.

The energy density at a welding spot 28 can be approximated by the radiance of the laser multiplied by the square of the numerical aperture of a respective beam 60 reaching object 22.

Adjustment of the size of apertures of objectives 50 by selection of their diametrical sizes in mask 52 or by conventional diaphragm means (not shown) may be made to compensate for nonuniformities in the intensity of beam 40a if desired. Also by such means, different energy densities can be obtained at different spots 28 in the pattern thereof if different types of welds are required in the spot pattern.

The smallest useful pinhole 46 for mode selection purposes is determined, of course, by the resolving limit of the individual objectives 50.

Figure 5:
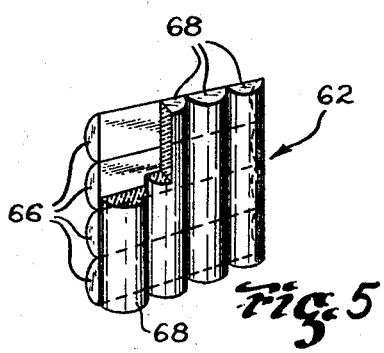
FIG. 5 is an illustration, in perspective, of a modified form of objective lens means with a portion thereof broken away to reveal its constructional nature.
Figure 6:
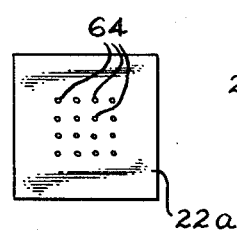
FIG. 6 is an illustration of a workpiece article upon which a pattern of welding spots is illustrated, the pattern being one attainable by incorporation of the modification of FIG. 5 in the welding system of FIG. 1.

Exemplary of specifications for system 20, FIG. 1, for welding aluminum pads 24 2 150 Angstroms in thickness to electrical leads 26 of NiCo alloy steel are as follows:

Output radiance of laser 38 (beam 40) = $10^6(j/cm.^2 sr.)$
Focal length of collecting lens 42 = 30 cm.
Size of pinhole 46 = a to 2 mm.
Focal length of objectives 50 = 10 cm.
Clear aperture of each objective 50 = 2 mm.
Number of objectives = 16
Energy density at spots 28 = $500 j/cm.^2$ In FIG. 5 there is illustrated a modified array 62 of objective lenses which may be substituted for objectives 50 for producing a pattern of welding spots 64 on an object 22a such as that shown in FIG. 6. The array 62 of objective lenses comprises two sets to parallel cylindrical lenses 66 and 68 respectively which are cemented together or otherwise mounted orthogonal to each other. In the resulting gridlike structure, each instance of one cylindrical lens crossing another constitutes the equivalent of a light-converging objective which, in a manner similar to any one of objectives 50 of FIG. 1, may be used to focus a beam of radiant welding energy upon a particular spot 64 of object 22a.

Figure 7:
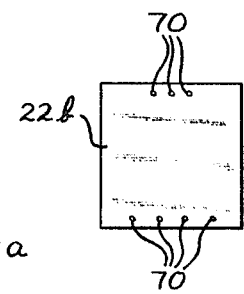
FIG. 7 is a view of an article similar to that of FIG. 6 wherein a different pattern of welding spots is illustrated.
Figure 8:
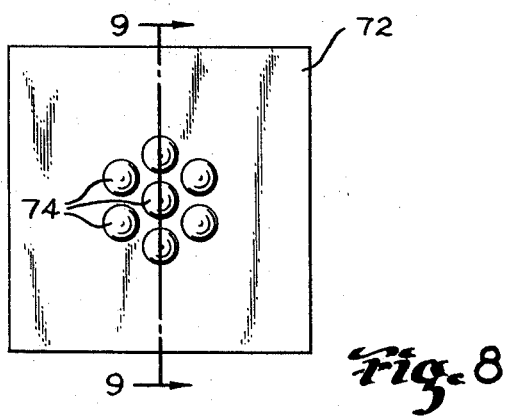
FIG. 8 is an elevational view of objective lens means which may be incorporated into the system of FIG. 1 for producing the spot pattern illustrated in FIG. 7.
Figure 9:
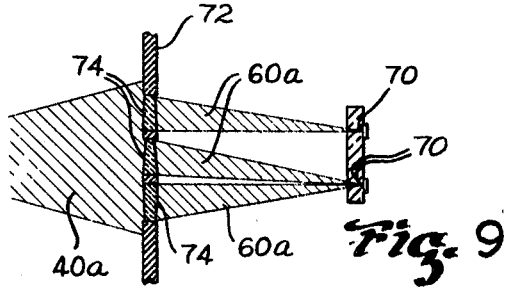
FIG. 9 is a cross-sectional view of FIG. 8 taken along line 9–9 thereon with an added schematic illustration of its function in producing the aforesaid welding spot pattern.

In instances where an uneven distribution of welding spots 70 on an object 22b (FIG. 7), for example, is desired or required, a mask 72 such as that shown in FIGS. 8 and 9 may be employed as a substitute for mask 52 in FIG. 1.

In this modification of the invention, converging lens 56 may be eliminated in system 20 or used in conjunction with prismatic objective lenses 74, FIG. 9.

Objective lenses 74 which may be off-axis sections of conventional double convex lenses can be arranged in compact, evenly distributed relationship with each other in mask 72 and, at the same time, direct beams 60a of welding spot energy prismatically to unevenly distributed and/or widespread welding spots 70, for example.

Those skilled in the art will readily appreciate that various modifications and adaptations of the precise form of the invention here shown may be made to suit particular requirements. Accordingly, it is intended that all modifications which fall within the claims or within the range of equivalency to which they are entitled, are intended to be covered.

I claim:

1. A system for spot welding an object with laser emitted radiation comprising:
   a laser for producing a beam of high density radiant energy;
   means for producing a mode selected diverging beam of said energy;
   a mask intercepting said diverging beam, said mask having a plurality of objective lenses therein through each of which at least a portion of said mode selected beam is permitted to pass for focusing thereby as respective welding spots, said objective lenses being arranged in side-by-side relationship with each other in said mask in a geometrical pattern corresponding to a pattern of welding spots desired to be produced upon said object whereby said object may be positioned at said welding spots for multiple spot welding thereof.

2. A system for spot welding an object with laser emitted radiation comprising:
   a laser for producing a beam of high density radiant energy;
   means for producing a mode selected diverging beam of said energy;
   a mask intercepting said diverging beam, said mask having a plurality of objective lenses therein through each of which at least a portion of said mode selected beam is permitted to pass for focusing thereby as respective welding spots, said objective lenses being individually selectively prismatic and arranged in a geometrical pattern differing from that desired of said welding spots wherewith the desired pattern of welding spots is formed by prismatic refraction of said mode selected energy by said objective lenses and said object may be placed at said welding spots for multiple spot welding thereof.

3. The method of spot welding an object with laser emitted energy comprising the steps of:
   selecting a mode of oscillation of said laser emitted energy and directing a beam thereof toward said object;
   bringing a multiplicity of portions of said beam simultaneously each to individual focus; and,
   locating said object at the resulting foci of said portions of said beam whereby a multiplicity of welding spots which correspond in number and position to said foci will be produced upon said object.

4. A spot welding system according to claim 1 wherein at least some of said objective lenses are of different aperture size preselected according to the intensity desired of said focused energy at said welding spots.

5. A spot welding system according to claim 1 wherein said plurality of objective lenses comprises an assembly of two sets of juxtapositioned elongated plano-cylindrical lens members, said members of one set being arranged with their respective plane surfaces extended orthogonally to and adjoining those of the other set.

6. The method according to claim 3 wherein said laser emitted energy is focused at a pinhole in an opaque mask to produce said beam.

7. The method according to claim 3 wherein said portions of said beam are directed by prismatic refraction to spaced points of foci preselected according to a desired patterning of said welding spots.